US007340175B2

(12) United States Patent
Wang et al.

(10) Patent No.: US 7,340,175 B2
(45) Date of Patent: Mar. 4, 2008

(54) NON-UNIFORM OPTICAL WAVEBAND AGGREGATOR AND DEAGGREGATOR AND HIERARCHICAL HYBRID OPTICAL CROSS-CONNECT SYSTEM

(75) Inventors: Ting Wang, Princeton, NJ (US); Rauf Izmailov, Plainsboro, NJ (US); Ruixue Fan, Cranbury, NJ (US); Stephen Weinstein, Summit, NJ (US)

(73) Assignee: NEC Corporation, Tokyo (JP)

( * ) Notice: Subject to any disclaimer, the term of this patent is extended or adjusted under 35 U.S.C. 154(b) by 999 days.

(21) Appl. No.: 10/100,990

(22) Filed: Mar. 20, 2002

(65) Prior Publication Data

US 2003/0185565 A1     Oct. 2, 2003

Related U.S. Application Data

(60) Provisional application No. 60/349,225, filed on Jan. 18, 2002.

(51) Int. Cl.
  *H04J 14/02* (2006.01)
(52) U.S. Cl. .................... 398/82; 398/79; 398/83; 398/84; 398/85; 398/87; 398/45; 398/46; 398/47; 398/48; 398/50; 398/56; 398/49; 385/24; 385/37; 385/16; 385/17; 385/18; 385/25; 385/27
(58) Field of Classification Search ............ 398/79, 398/56, 50, 45, 82, 48, 83, 85, 84, 87, 46, 398/47, 49; 385/24, 25, 16, 17, 18, 27, 37
See application file for complete search history.

(56) References Cited

U.S. PATENT DOCUMENTS 5,422,968 A    6/1995  Hanatani et al.

5,457,760 A    10/1995 Mizrahi (Continued)

FOREIGN PATENT DOCUMENTS

CN    1295394A A1    5/2001

(Continued)

OTHER PUBLICATIONS

Itaru Nishioka, Rauf Izmailov, Takehiko Suemura, Yoshiharu Maeno. and Soichiro Araki "Routing control which takes into account demand fluctuations in a hierarchical optical network," Second Photonic Network-Based Internet (PNI) Technology Research Conference, Type Two Research Conference Materials, Institute of Electronics, Information and Communication Engineers, Nov. 22, 2001, PNI2001-14, p. 17-22.

(Continued)

*Primary Examiner*—Hanh Phan
(74) *Attorney, Agent, or Firm*—Sughrue Mion, PLLC

(57) ABSTRACT

Hierarchical hybrid optical networking is based on balancing cost and performance of optical networks by providing transparent (optical) switching of subsets of wavelengths in addition to opaque (electrical) switching of individual light paths. Effective use of wavelength-subset switching requires aggregating and deaggregating wavelength subsets in a simple, cost-effective manner. Non-uniform wavebands are introduced and analyzed their performance advantage as compared with uniform wavebands. Also proposed are several architectural options for a hierarchical hybrid optical cross-connect system that combines non-uniform wavebands and improved utilization of OEO ports.

27 Claims, 14 Drawing Sheets

U.S. PATENT DOCUMENTS

| | | |
|---|---|---|
| 5,629,995 A | 5/1997 | Duck et al. |
| 5,652,814 A * | 7/1997 | Pan et al. .................... 385/24 |
| 5,805,320 A * | 9/1998 | Kuroyanagi et al. .......... 398/56 |
| 5,808,320 A * | 9/1998 | Dennison .................... 257/68 |
| 5,852,505 A | 12/1998 | Li |
| 5,943,149 A * | 8/1999 | Cearns et al. ................. 398/79 |
| 6,208,444 B1 | 3/2001 | Wong et al. |
| 6,256,431 B1 * | 7/2001 | Mesh ......................... 385/24 |
| 6,263,126 B1 | 7/2001 | Cao |
| 6,493,119 B1 * | 12/2002 | Kuo et al. .................... 398/49 |
| 6,545,782 B1 * | 4/2003 | Wang et al. .................. 398/79 |
| 6,631,018 B1 * | 10/2003 | Milton et al. ................ 398/59 |
| 6,950,609 B2 * | 9/2005 | Marom ....................... 398/83 |
| 7,043,158 B1 * | 5/2006 | Kuroyanagi et al. .......... 398/56 |
| 2001/0015836 A1 | 8/2001 | Kim et al. |
| 2002/0003643 A1 * | 1/2002 | Qian et al. ................ 359/127 |

FOREIGN PATENT DOCUMENTS

| | | |
|---|---|---|
| CN | 1302129A A1 | 7/2001 |
| JP | 6-6844 A | 1/1994 |
| JP | H8-65267 A | 3/1996 |
| JP | H8-130756 A | 5/1996 |
| JP | H10-177115 A | 6/1998 |
| JP | 11-337765 A | 12/1999 |
| JP | 2000-115134 A | 4/2000 |
| JP | 2001-134649 A | 5/2000 |
| JP | 2001-8244 A | 1/2001 |
| JP | 2001-215349 A | 8/2001 |
| JP | 2003-219440 A | 7/2003 |
| WO | WO 01/89120 A2 | 11/2001 |

OTHER PUBLICATIONS

Rauf Izmailov et al., "Non-Uniform Waveband Hierarchy in Hybrid Optical Networks," INFOCOM 2003, IEEE, Mar. 2003, vol. 2, p. 1344-1354.

* cited by examiner

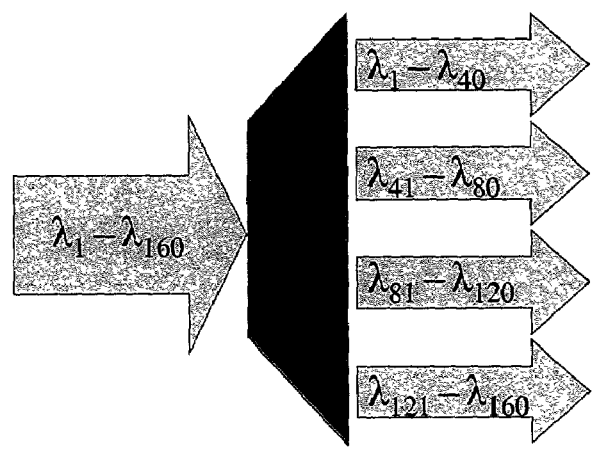
Figure 1: Waveband deaggregator producing four uniform fixed wavebands.
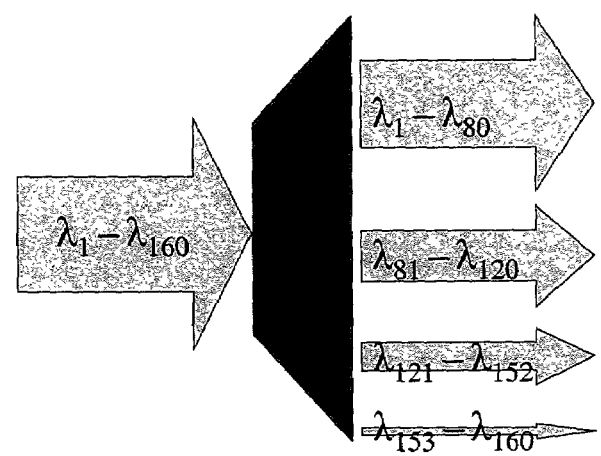
Figure 2: Waveband deaggregator producing four non-uniform fixed wavebands.

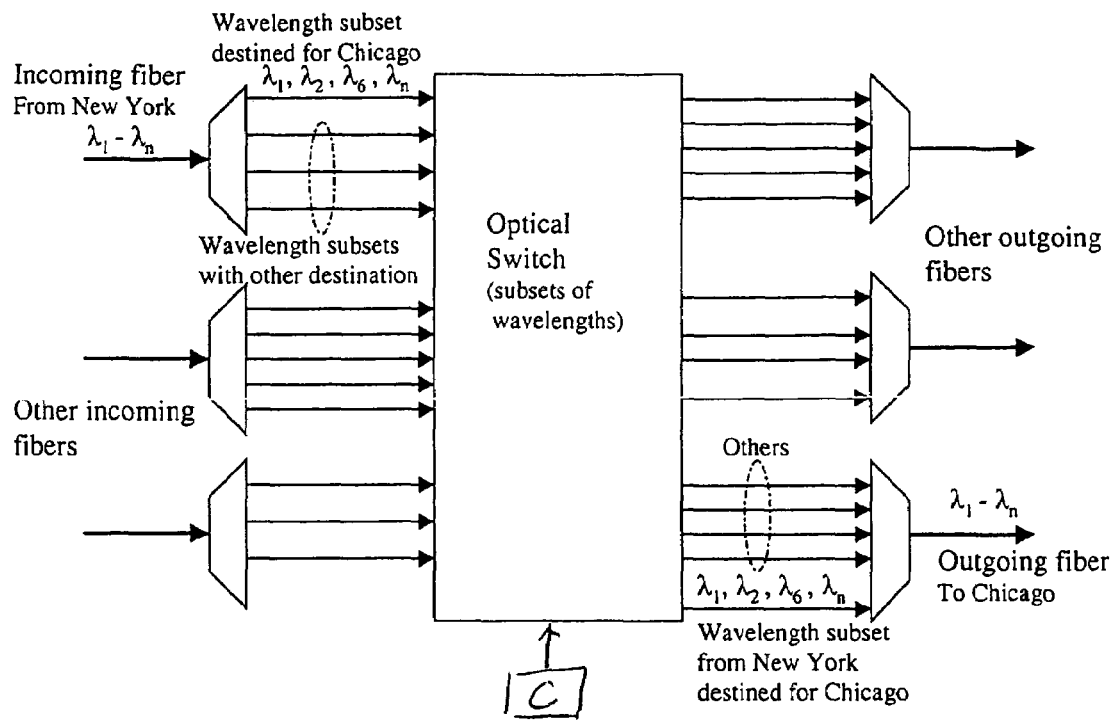
Figure 3: Application of waveband aggregators and deaggregators in a cross-connect system of a DWDM optical network.
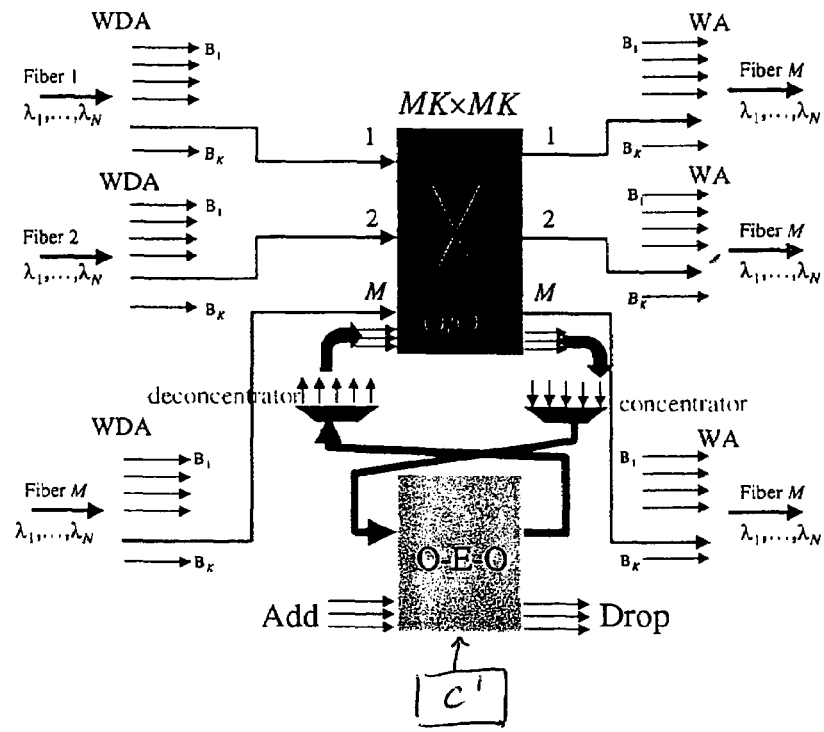
Figure 4: Hierarchical hybrid optical cross-connect system: single plane architecture.

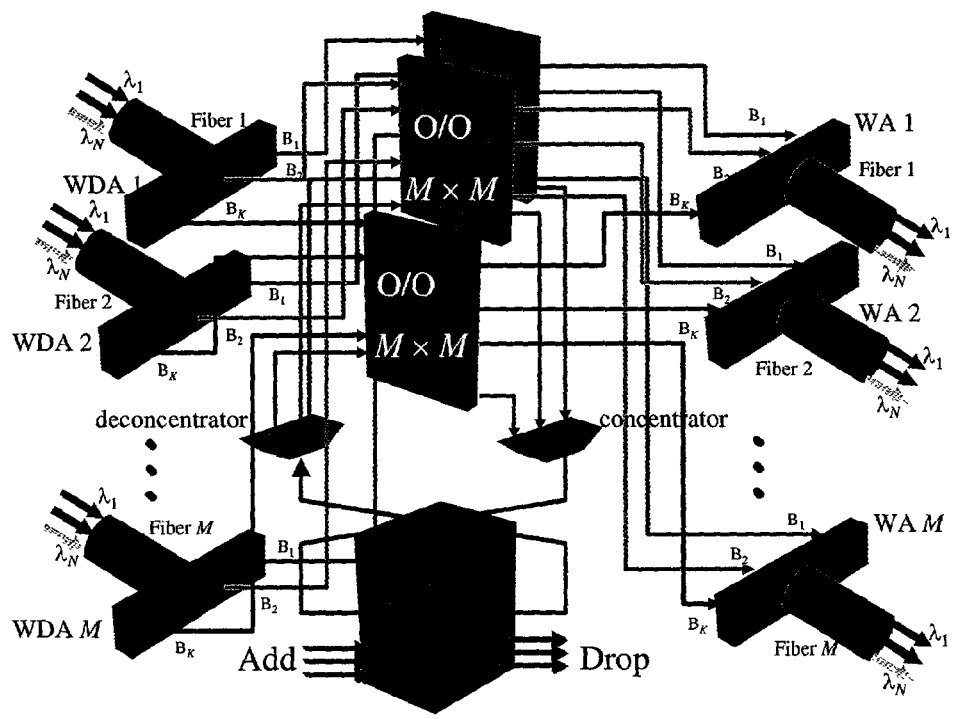
Figure 5: Hierarchical optical cross-connect system: multiple plane architecture.
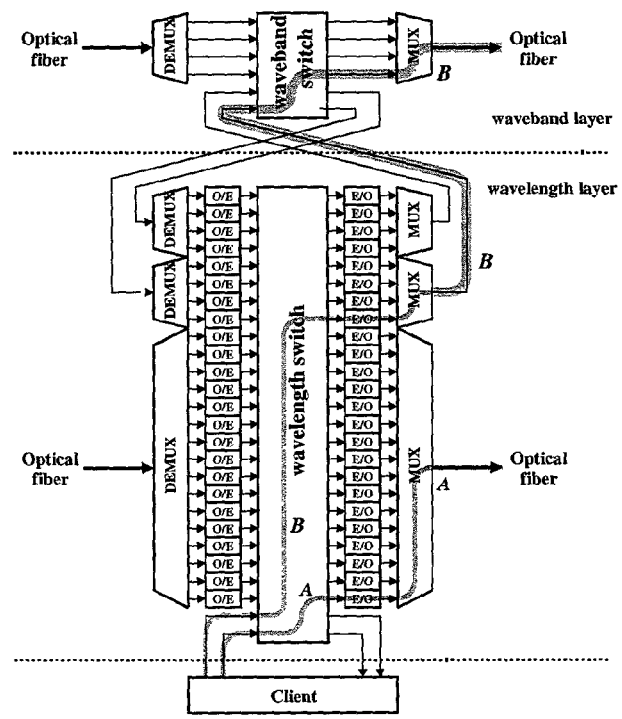
Figure 6: Hierarchical hybrid optical cross-connect system: adding and dropping traffic.

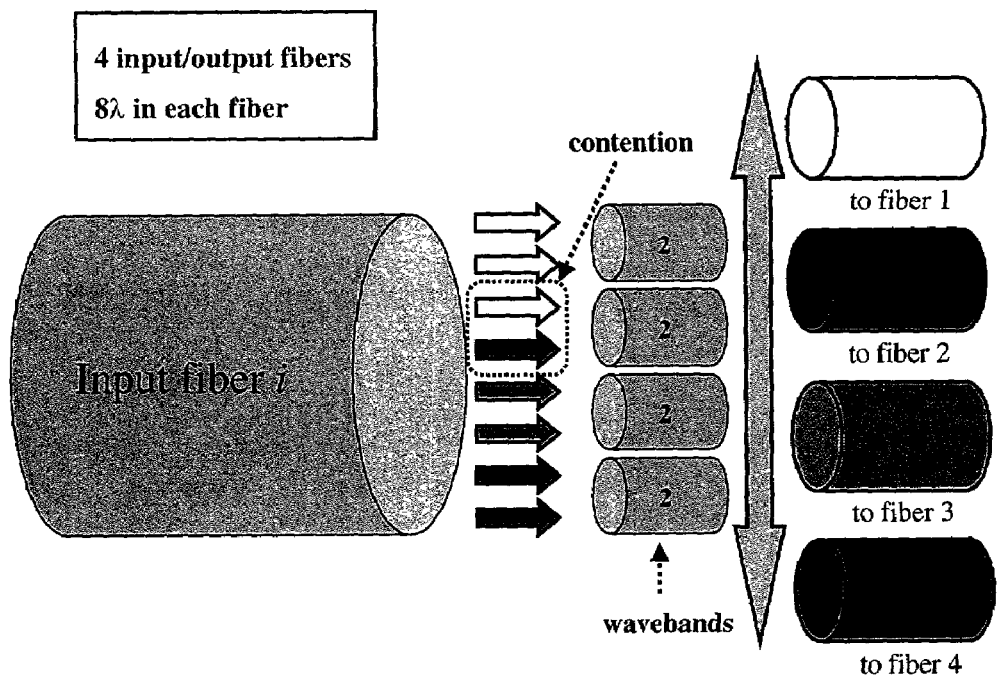
Figure 7: Example of uniform wavebands.
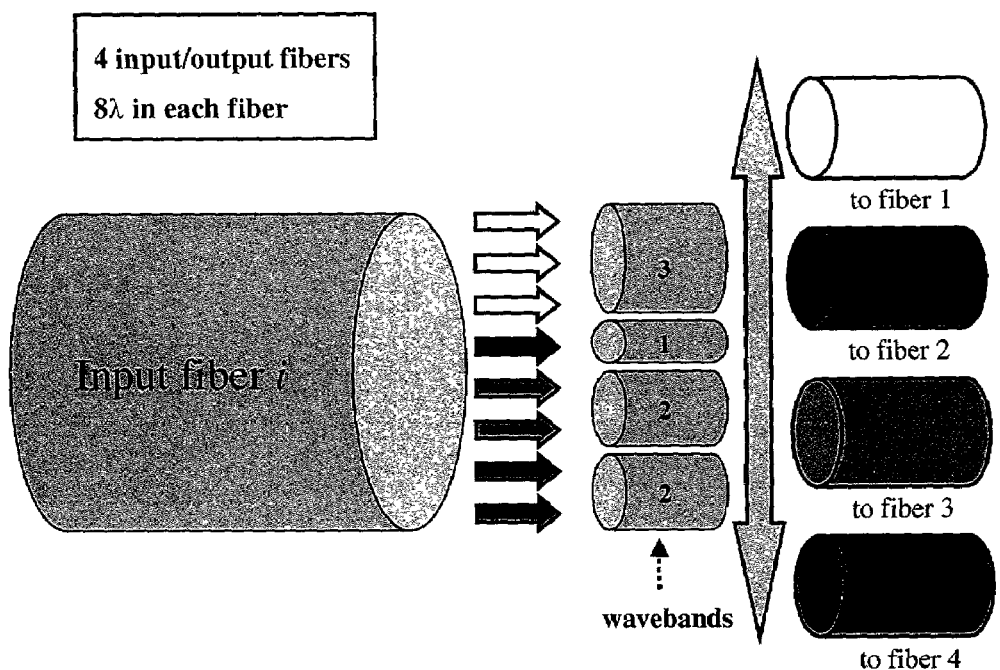
Figure 8: Example of uniform wavebands.

| probability | wavelengths directed to | | Uniform (4λ+4λ) | | Throughput | Non-uniform (5λ+3λ) | | Throughput |
|---|---|---|---|---|---|---|---|---|
| | 1st fiber | 2nd fiber | | | | | | |
| 1/256 | 0 | 8 | 0 | 4+4 | 1 | 0 | 5+3 | 1 |
| 8/256 | 1 | 7 | 0 | 4+4 | 7/8 | 0 | 5+3 | 7/8 |
| 28/256 | 2 | 6 | 4 | 4 | 6/8 | 3 | 5 | 7/8 |
| 56/256 | 3 | 5 | 4 | 4 | 7/8 | 3 | 5 | 1 |
| 70/256 | 4 | 4 | 4 | 4 | 1 | 3 | 5 | 7/8 |
| 56/256 | 5 | 3 | 4 | 4 | 7/8 | 5 | 3 | 1 |
| 28/256 | 6 | 2 | 4 | 4 | 6/8 | 5 | 3 | 7/8 |
| 8/256 | 7 | 1 | 4+4 | 0 | 7/8 | 5 | 3 | 7/8 |
| 1/256 | 8 | 0 | 4+4 | 0 | 1 | 5 | 3 | 1 |
| | | | | | 88% | | | 93% |

Figure 9: Comparison of uniform and non-uniform wavebands (2 output fibers, 8 wavelengths).

| | I/O fibers | λ per fiber | waveband groups | λ "loss" ratio |
|---|---|---|---|---|
| Uniform | 2 | 8 | 4+4 | 11.72% |
| Non-uniform | 2 | 8 | 3+5 | 6.93% |
| Uniform | 2 | 8 | 2+2+2+2 | 6.25% |
| Non-uniform | 2 | 8 | 1+2+2+3 | 0.0% |
| Uniform | 2 | 16 | 8+8 | 9.49% |
| Non-uniform | 2 | 16 | 7+9 | 5.83% |
| Uniform | 2 | 16 | 4+4+4+4 | 6.23% |
| Non-uniform | 2 | 16 | 2+3+5+6 | 0.35% |
| Uniform | 4 | 8 | 2+2+2+2 | 6.23% |
| Non-uniform | 4 | 8 | 1+2+2+3 | 2.04% |
| Uniform | 4 | 16 | 4+4+4+4 | 12.57% |
| Non-uniform | 4 | 16 | 3+4+4+5 | 7.54% |
| Uniform | 4 | 16 | 2+2+2+2+2+2+2+2 | 6.48% |
| Non-uniform | 4 | 16 | 1+1+1+1+2+3+3+4 | 0.00% |

Figure 10: Comparison of uniform and non-uniform wavebands.

| N | M | R | % | N | M | R | % | N | M | R | % |
|---|---|---|---|---|---|---|---|---|---|---|---|
| 6 | 2 | 3 | 20 | 42 | 2 | 6 | 17 | 62 | 15 | 31 | 14 |
| 8 | 2 | 4 | 14 | 42 | 10 | 21 | 14 | 63 | 8 | 21 | 15 |
| 10 | 3 | 5 | 18 | 44 | 4 | 11 | 16 | 65 | 4 | 13 | 14 |
| 12 | 2 | 4 | 20 | 44 | 11 | 22 | 14 | 66 | 16 | 33 | 14 |
| 12 | 3 | 6 | 14 | 45 | 3 | 9 | 15 | 68 | 6 | 17 | 15 |
| 14 | 4 | 7 | 17 | 45 | 6 | 15 | 15 | 68 | 16 | 34 | 13 |
| 16 | 4 | 8 | 14 | 46 | 11 | 23 | 14 | 69 | 9 | 23 | 15 |
| 18 | 5 | 9 | 16 | 48 | 2 | 6 | 17 | 70 | 2 | 7 | 15 |
| 20 | 2 | 5 | 18 | 48 | 4 | 12 | 14 | 70 | 3 | 10 | 15 |
| 20 | 5 | 10 | 14 | 48 | 6 | 16 | 14 | 70 | 17 | 35 | 14 |
| 21 | 3 | 7 | 17 | 50 | 12 | 25 | 14 | 72 | 6 | 18 | 14 |
| 24 | 6 | 12 | 14 | 51 | 7 | 17 | 16 | 72 | 17 | 36 | 13 |
| 25 | 2 | 5 | 19 | 52 | 13 | 26 | 14 | 74 | 18 | 37 | 14 |
| 26 | 7 | 13 | 16 | 54 | 2 | 6 | 17 | 76 | 18 | 38 | 13 |
| 28 | 7 | 14 | 14 | 54 | 3 | 9 | 16 | 77 | 2 | 7 | 15 |
| 30 | 2 | 5 | 20 | 54 | 7 | 18 | 15 | 78 | 4 | 13 | 15 |
| 30 | 4 | 10 | 15 | 54 | 13 | 27 | 14 | 78 | 10 | 26 | 15 |
| 32 | 3 | 8 | 16 | 56 | 5 | 14 | 15 | 78 | 19 | 39 | 14 |
| 32 | 8 | 16 | 14 | 58 | 14 | 29 | 14 | 80 | 3 | 10 | 15 |
| 36 | 2 | 6 | 16 | 60 | 2 | 6 | 18 | 80 | 5 | 16 | 14 |
| 36 | 5 | 12 | 16 | 60 | 4 | 12 | 15 | 80 | 7 | 20 | 15 |
| 36 | 9 | 18 | 14 | 60 | 5 | 15 | 14 | 80 | 19 | 40 | 13 |
| 39 | 5 | 13 | 15 | 60 | 8 | 20 | 15 | | | | |
| 40 | 3 | 8 | 18 | | | | | | | | |
| 40 | 10 | 20 | 14 | | | | | | | | |
Figure 11: Optical throughput improvement for various $N$ and $M$.
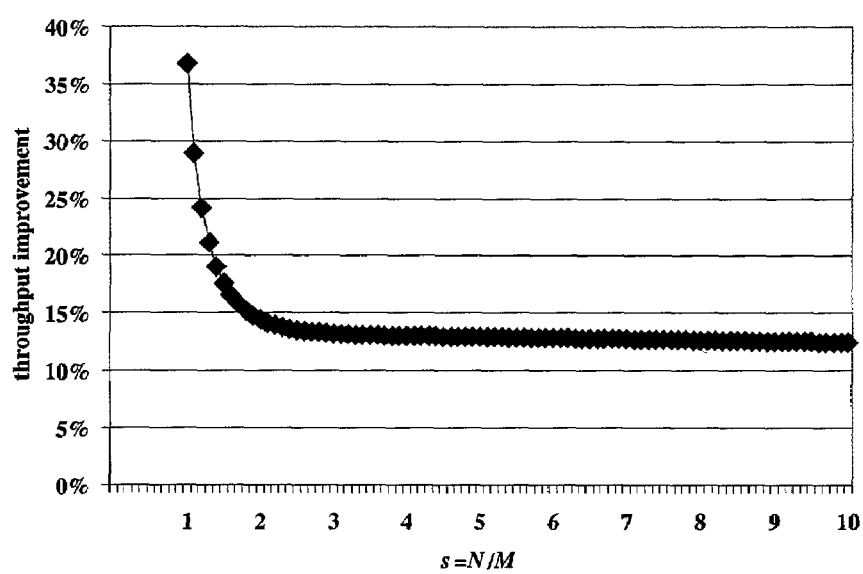
Figure 12: Optical throughput improvement for various $s$.

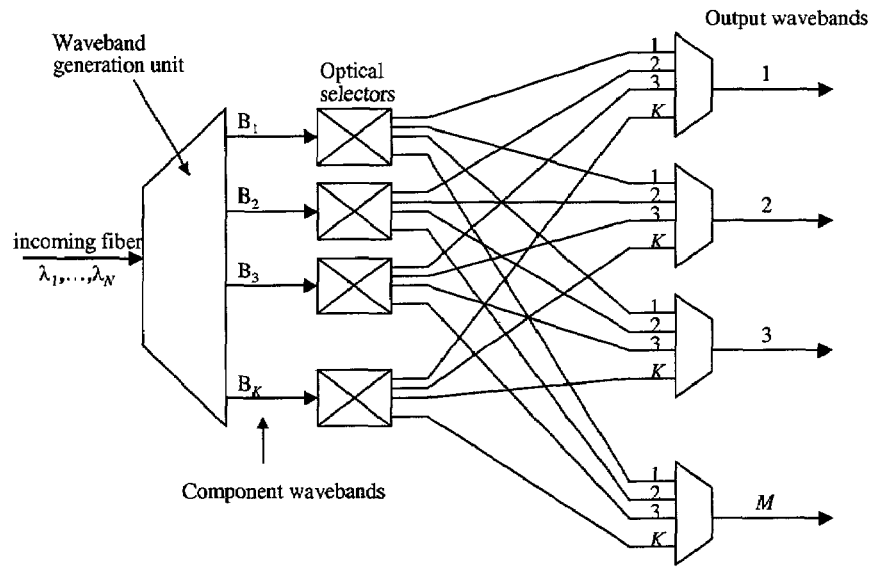
Figure 13: A general structure of wavelength deaggregator.
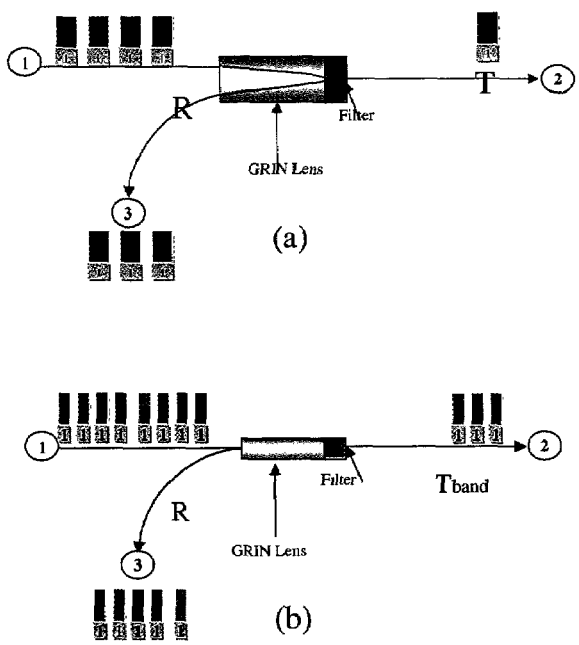
Figure 14: A thin-film interference filter based wavelength and waveband separator (T is transmitted light, R is reflected light).

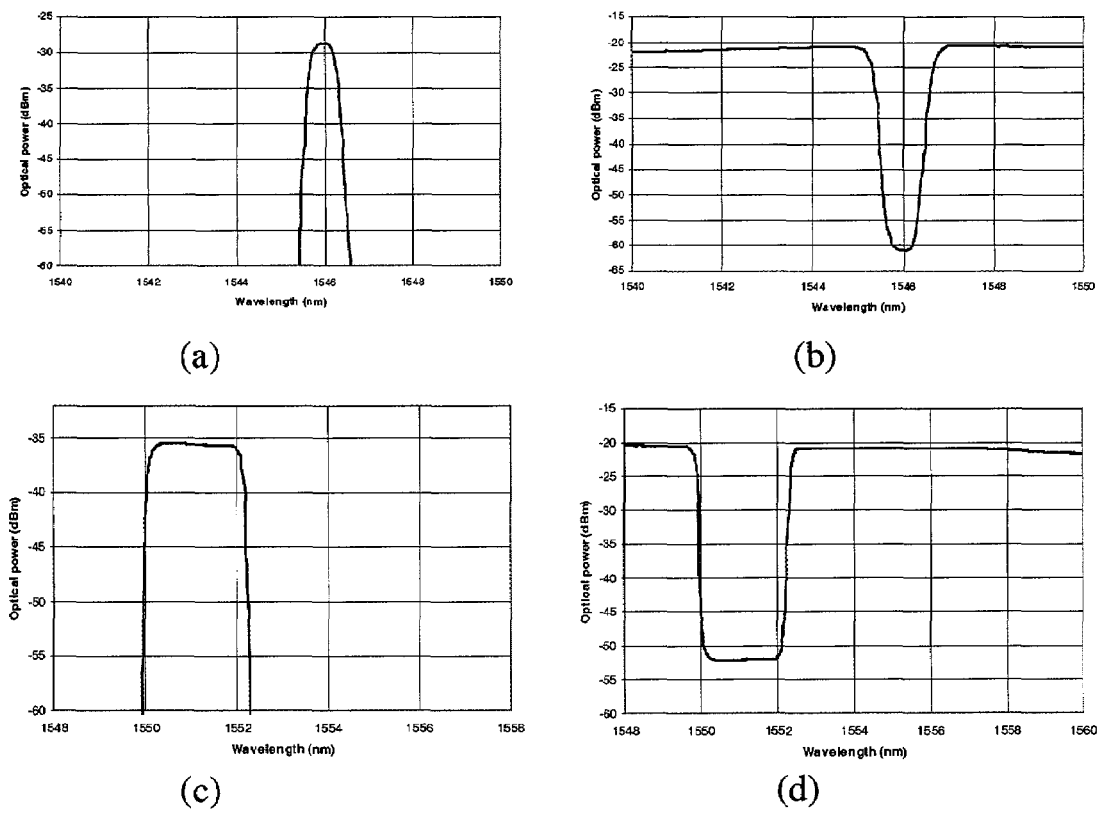
Figure 15: Optical spectra of three-ports optical wavelength separation device.
(a) Single wavelength transmission; (b) Reflected wavelengths; (c) Wavelength band transmission; (d) Reflection of other wavelengths.

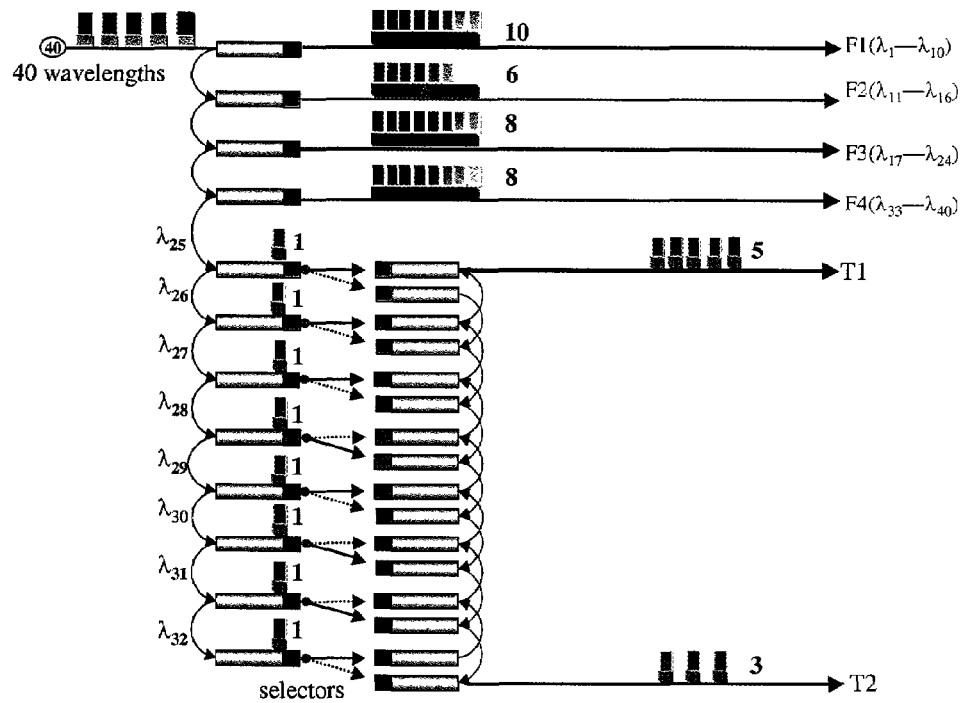
Figure 16: An example implementation of a reconfigurable wavelength aggregation device with both fixed and arbitrary wavelength sets.
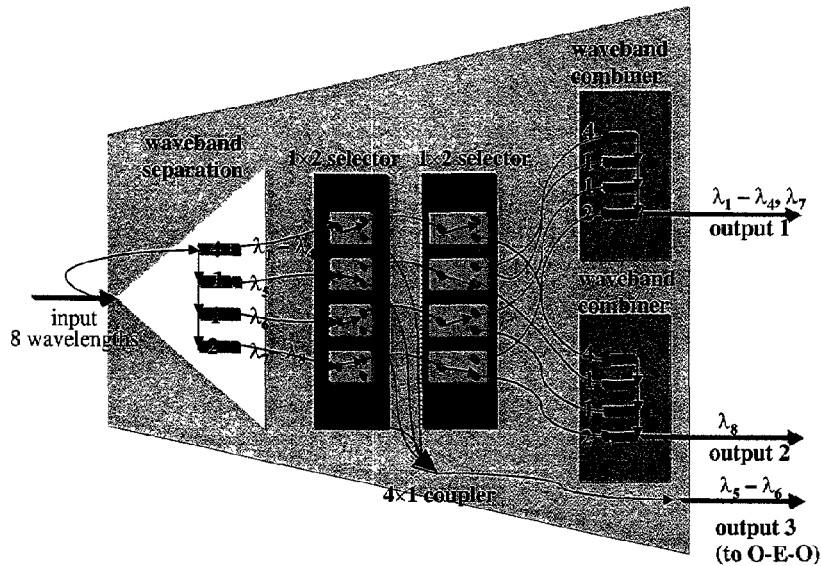
Figure 17: An example of 1×2 deaggregator and 8 wavelengths separated into 4 non-uniform wavebands.

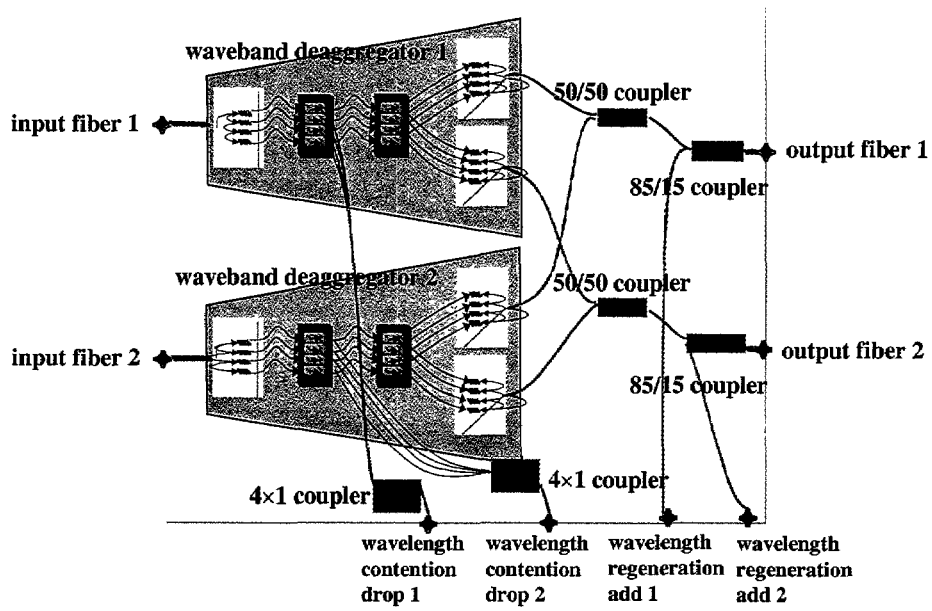
Figure 18: An application example of 2×2 16 optical non-uniform waveband cross-connect system with 16 wavelengths using two non-uniform waveband deaggregators.
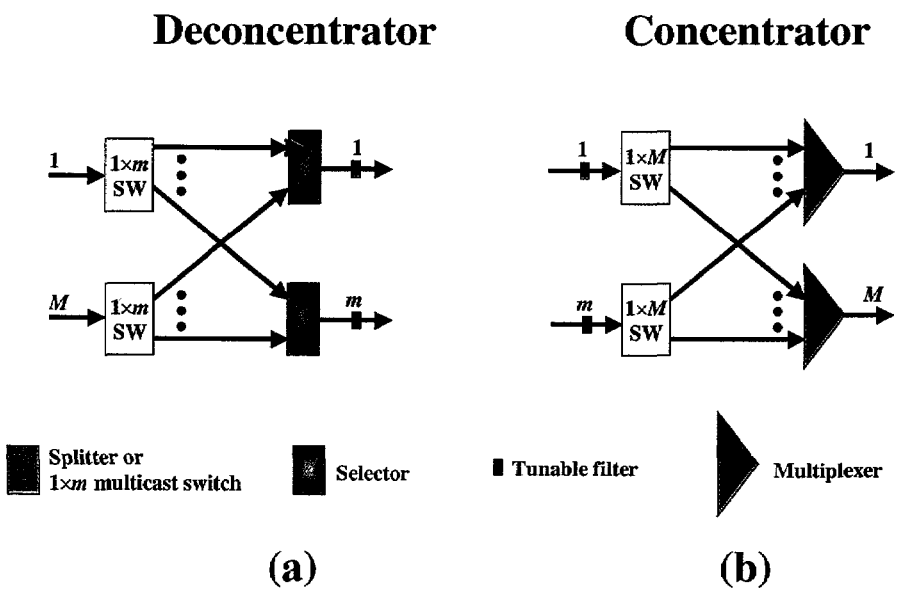
Figure 19: Deselector (a) and selector (b).

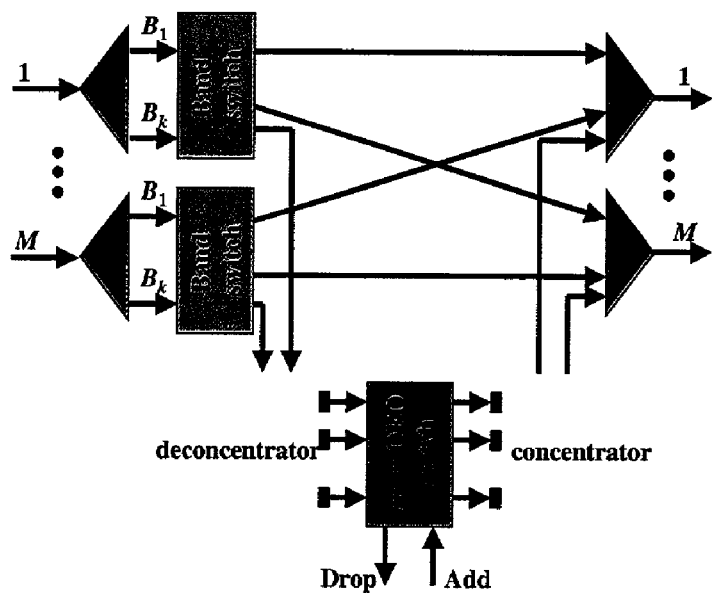
Figure 20: Band switches architecture with deselector and selector.
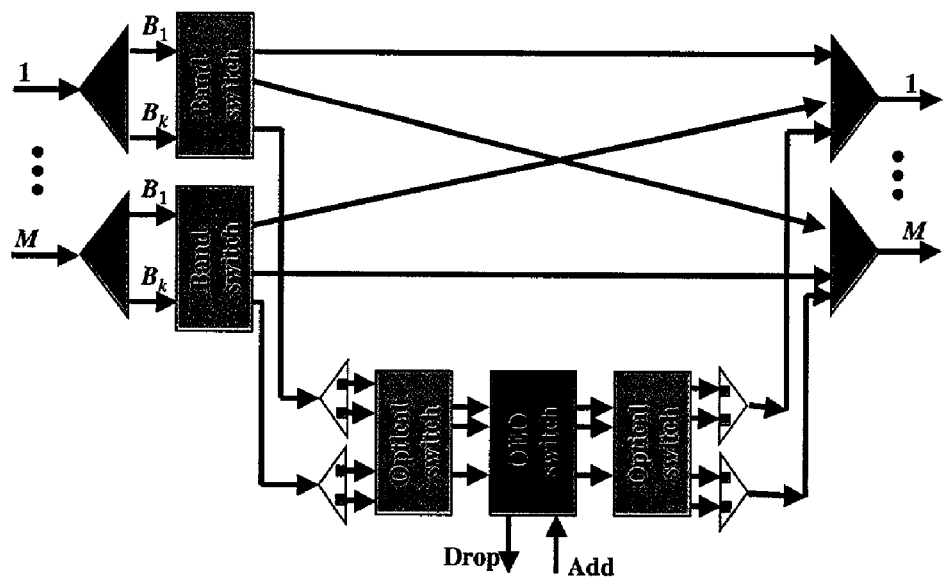
Figure 21: Band switches architecture with optical switches.

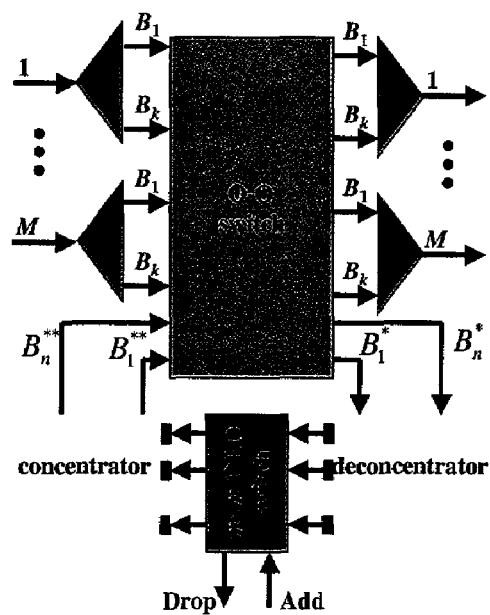
Figure 22: Single plane architecture with deselector and selector.
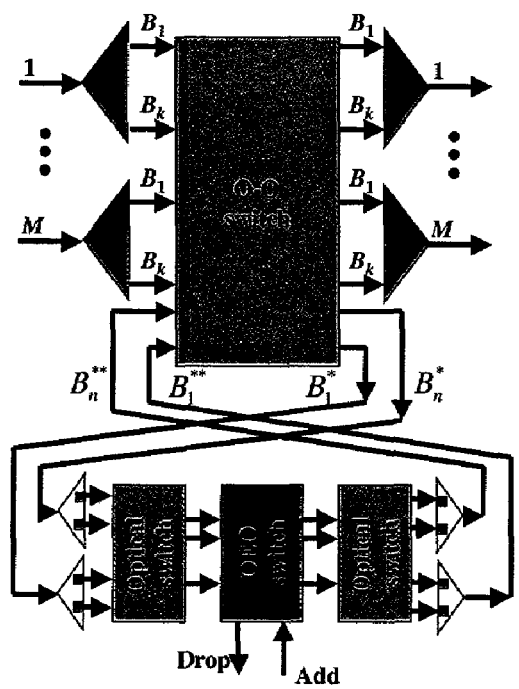
Figure 23: Single plane architecture with optical switches.

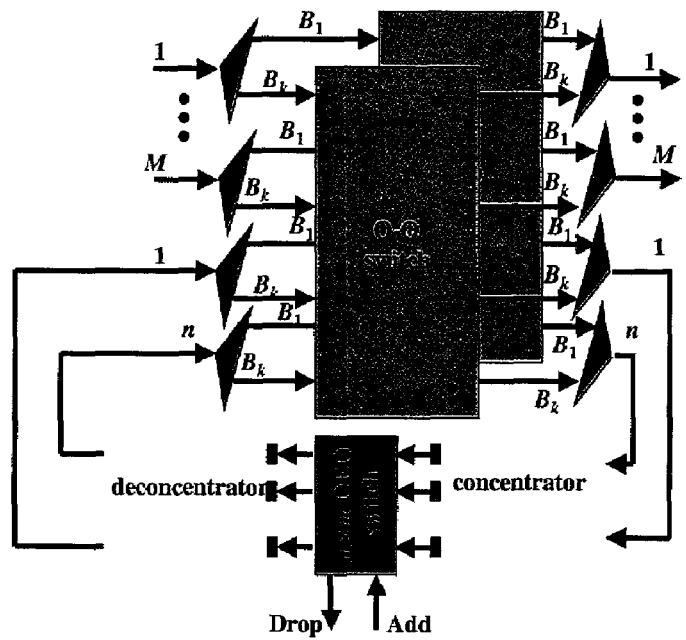
Figure 24: Multiple plane architecture with deselector and selector.
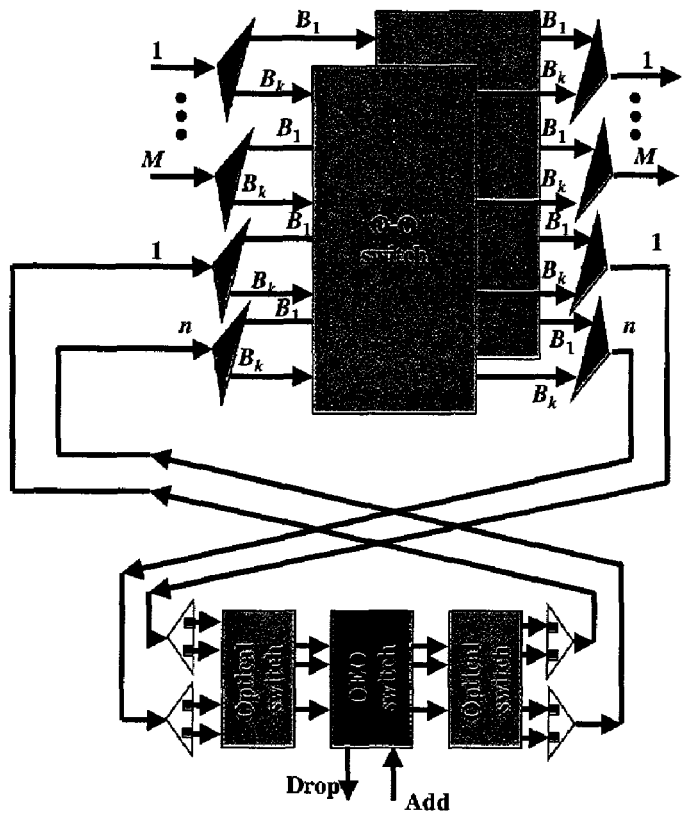
Figure 25: Multiple planes architecture with optical switches.

Fig. 26 is an illustration of an additional embodiment of a reconfigurable wavelength (de)aggregator device with both fixed and arbitrary wavelength sets.
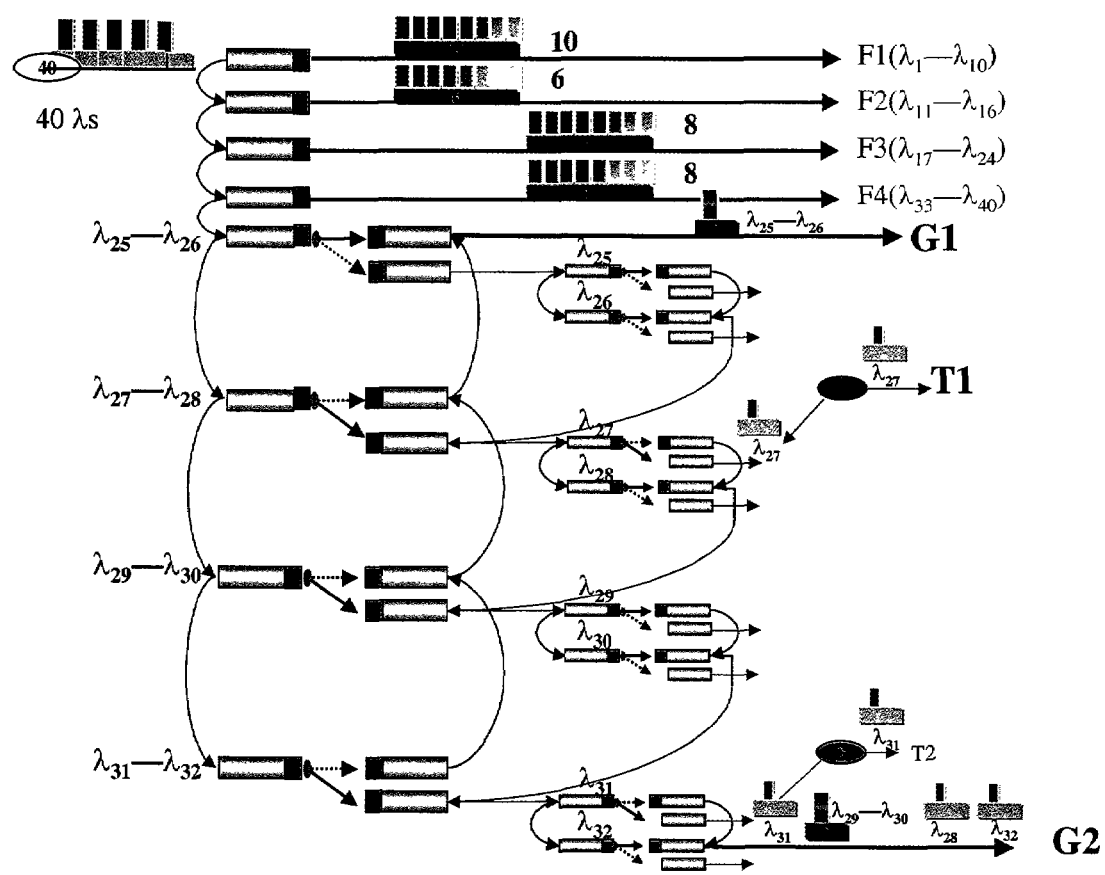

NON-UNIFORM OPTICAL WAVEBAND AGGREGATOR AND DEAGGREGATOR AND HIERARCHICAL HYBRID OPTICAL CROSS-CONNECT SYSTEM

This application claims benefit to Provisional Application No. 60/349,225 filed Jan. 18, 2002; the disclosure of which is incorporated herein by reference.

BACKGROUND OF THE INVENTION

The continuing increase of data traffic keeps the pressure on the backbone telecommunication networks. In order to satisfy the growing bandwidth demands, more diverse and more intelligent allocation of capacity is required. Optical networking has become a key technology to accommodating rapidly expanding Internet traffic. New optical networks are expected to support the increasing network load by employing both sophisticated transmission (dense wavelength division multiplexing (WDM)) and switching (optical switches and cross-connects) technologies.

Dense wavelength division multiplexing, the transmission of multiple wavelengths over a single strand of optical fiber, has become the foundation providing the capacity and traffic separation capabilities required in the future Optical Internet. A key enabling technology of DWDM is optical wavelength multiplexing and demultiplexing, which aggregates wavelengths in the 1550 nm passband of low fiber attenuation. FIG. 1 shows a typical DWDM implementation for a point-to-point-link.

In IP networks, performance and scalability concerns prompted development of layered mechanisms providing various levels of traffic aggregation supported by DiffServ and MPLS (multi-protocol label switching) standards. In case of the optical networking, the same cost and scalability concerns translate into creation of multiple switching granularities, such as wavelengths and wavebands. The optical networking paths thus form a hierarchy in which a higher-layer path (waveband) consists of several lower layer paths (wavelengths). The potential cost benefits of wavelength aggregation into wavebands was previously demonstrated by Y. Suemura, I. Nishioka, Y. Maeno and S. Araki, *Routing of Hierarchial Paths in an Optical Network*, Proceedings of APCC 2001.

As illustrated in FIG. 1, the wavebands conventionally are uniform and fixed. In other words, given input wavelengths $\lambda_1$-$\lambda_{160}$, the conventional waveband groups comprise four groups of forty contiguous wavelengths, $\lambda_1$-$\lambda_{40}$, $\lambda_{41}$-$\lambda_{80}$, $\lambda_{81}$-$\lambda_{120}$, $\lambda_{121}$-$\lambda_{160}$. Use of uniform wavebands follows conventional wisdom in network design whereby aggregation (grooming) of communications channels is provided in a uniform manner. SONET is an example of uniform aggregation (grooming) of communications channels.

A waveband path occupies only two (input and output) ports of an optical switch in a cross-connect system. The path hierarchy reduces costs of a cross-connect system since a waveband can be switched optically as a single unit, thus reducing the number of more expensive (optical-electrical-optical) OEO ports required for processing individual wavelengths.

Cost-efficient implementation of the optical hierarchy has to be delivered by appropriately designed routing and scheduling algorithms. Routing and wavelength assignment algorithms were extensively studied in the general context of optical networking, such as in R. Ramasawami and K. Sivarajan, *Optical Networks: A Practical Perspective*, Morgan Kaufmann Publishers, 1998. The hierarchy of wavelengths and wavebands can be cast in several models posing new routing and scheduling challenges.

As previously discussed, the waveband hierarchical path reduces cost of a cross-connect system because a waveband path occupies only two (input and output) ports of an optical switch in a cross-connect system. However, switching exclusively in the optical domain is not practicable. Contention for the same output fiber among different wavebands cannot be resolved in the transparent (optical) part of the system. The optical core also cannot process a waveband if different wavelengths in it have to be switched into different output fibers. For these and other related tasks (such as adding a wavelength into a waveband), one or more wavebands have to be dropped to the OEO part of the optical cross-connect system. The OEO is equipped with multiplexers and demultiplexers, each of them capable to process a waveband consisting of G wavelengths. The hierarchical cross-connect system functionality is realized by hybrid optical systems consisting of a waveband (optical transparent) and a wavelength (opaque OEO) switch. The detailed architecture of the hierarchical hybrid optical cross-connect system can be based either on a single plane architecture or on multiple planes architecture.

As an example of the uniform waveband in a hybrid hierarchy, FIG. 4 shows a hierarchical hybrid optical cross-connect system with M input and output fibers. Each fiber carries N wavelengths (typical numbers are N=160 and N=40 for backbone and metro networks). Upon reaching the optical cross-connect system, all N wavelengths in each input fiber are partitioned by waveband deaggregators (denoted as WDA in the figures). WDAs can be realized using either interleavers or filters, to partition the N wavelengths into K wavebands (each consisting of G wavelengths) where N=KG. The waveband level of the optical hierarchy thus consists of wavebands each comprised of G wavelengths. The wavebands are optically switched and aggregated (using waveband aggregators, denoted by WA in the figures) into output fibers by an optical core of the hierarchical cross-connect system. The optical core may be realized by a single optical switch or by K parallel optical switches (FIG. 5, $O/O_1$ to $O/O_K$), each handling the same waveband from all the incoming fibers.

As shown in FIG. 6, a wavelength path input to the wavelength switch can be either directly routed to a neighbor cross-connect system (shown as flow A) or aggregated into a waveband path which is then routed to a neighbor cross-connect system via a waveband switch (shown as flow B).

The OEO port is an expensive resource depending on the technology and the transmission speed, OEO ports can be between two and five times more expensive than optical ones. Thus the design of hierarchical hybrid optical cross-connect system requires taking into account the impact of the wavelength aggregation into wavebands. Specifically, the size G of a waveband directly affects both the cost and performance of the cross-connect system. On one hand, the small number G (fewer wavelengths per waveband) creates a large number of wavebands which have to be switched by a large and expensive waveband optical core of the cross-connect system. On the other hand, the large number G (more wavelengths per waveband) increases the need for OEO conversion, as large wavebands create more wavelength conflicts, as well as wavelength aggregation and deaggregation overhead. This creates the need for a large and expensive OEO part of the cross-connect system. Conventionally, uniform wavebands had to be resolved to isolate individual wavelengths of interest. Therefore, in the example of FIG. 1, if $\lambda_{12}$ were to be isolated for local processing (add, drop or switching), each and every wavelength of the waveband $\lambda_1$-$\lambda_{40}$ had be resolved through an OEO switch. It is clear that this conventional approach through the OEO switch is costly in terms of performing unnecessary processing for $\lambda_1$-$\lambda_{11}$ and $\lambda_{13}$ to $\lambda_{40}$ and the number of additional OEO ports needed to isolate the single wavelength $\lambda_{12}$.

Cost-performance analysis of a hierarchical hybrid optical cross-connect system has been performed. It has previously been determined that the waveband size close to G=6 provides a reasonable performance (50% of the optimal one) for significant cost reduction (by the factor of 5-10). Analysis of network-level performance suggests the similar range for optimal waveband size (close to G=8). Hierarchical routing and optical wavebands can reduce the cost (measured in terms of the number of ports required to process a given traffic load in the network) by two-three times, in comparison with traditional OEO-based solutions.

The cost advantage of the optical hierarchy is based on the fact that a waveband can be switched by the optical cross-connect system as a single unit, thus reducing the number of expensive (optical-electrical-optical) OEO ports required for processing individual wavelengths. The optical paths thus form a hierarchy in which a higher-layer path (waveband) consists of several lower layer paths (wavelengths). In order to avoid expensive OEO conversion of wavelengths, the flows destined to individual output fibers should be aggregated in preconfigured wavebands, which are then switched in the optical domain. The wavebands can be created when there is sufficient number of wavelengths routed along the same path direction. Routing algorithms, optical impairment considerations and wavelength contention resolution also affect the creation of wavebands. One skilled in the art would understand the basic mechanism of assignment of wavelengths into wavebands. Details of that assignment are not provided here.

SUMMARY OF THE INVENTION

The embodiments of the present invention obviate the above deficiencies of conventional optical network cross-connect systems.

One aspect of the invention is the recognition that the organization of wavelengths into wavebands can be further improved by using non-uniform wavebands (groups containing different numbers of wavelengths). An exemplary non-uniform set of wavebands is shown in FIG. 2. Any grouping of wavelengths is possible, and the invention is not limited by any specific non-uniform waveband groupings. The non-uniform wavebands can also be aggregated for output to a single fiber. (See, for example, FIG. 4 and FIG. 5, elements WA (waveband aggregators)). Non-uniform wavebands provide more flexibility for wavelength aggregation which can be used for more efficient switching and routing. The present inventors have analyzed the performance improvement that can be delivered using non-uniform wavebands, and selection of appropriate sizes of non-uniform wavebands parameters. The present inventors also demonstrate several architectures of hierarchical hybrid optical cross-connect systems that are based on non-uniform waveband separations in a DWDM optical network system.

As a further and related feature, a novel optical switching cross-connect system is proposed with the capability of reconfiguring wavelength bands and dynamically aggregating wavelengths or wavebands for different traffic patterns and directional wavelength allocations, in an optical cross-connect system having an active optical switching component.

DESCRIPTION OF THE DRAWINGS

Preferred embodiments of the invention will be described with reference to the appended drawings where:

FIG. 1 illustrates a deaggregator having uniform wavebands;

FIG. 2 illustrates a deaggregator having non-uniform wavebands;

FIG. 3 illustrates an application of waveband aggregators and waveband deaggregators in a cross-connect system of a WDM optical network;

FIG. 4 illustrates a hierarchical hybrid optical cross-connect system in a single plane architecture;

FIG. 5 illustrates a hierarchical hybrid optical cross-connect system in a multiple plane architecture;

FIG. 6 illustrates a hierarchical hybrid optical cross-connect system for adding and dropping data traffic locally at the cross-connect system;

FIG. 7 illustrates an input fiber and output fibers with uniform wavebands;

FIG. 8 illustrates an input fiber and output fibers with non-uniform wavebands;

FIG. 9 illustrates a comparison of uniform and non-uniform wavebands with two output fibers and eight wavelengths;

FIG. 10 illustrates comparisons of uniform and non-uniform wavebands with eight and sixteen wavelengths;

FIG. 11 illustrates an optical throughput improvement for various numbers of wavebands (K) and number of output fibers (M) for N wavelengths;

FIG. 12 illustrates optical throughput improvement for various s (ratio of number of wavelengths to number of output fibers);

FIG. 13 illustrates a general structure of a wavelength deaggregator;

FIG. 14 illustrates a thin-film interference filter based wavelength (FIG. 14A) and waveband (FIG. 14B) separator;

FIG. 15 illustrate optical spectra of a three-port optical wavelength separation device; FIG. 15A illustrates a single wavelength transmission; FIG. 15B illustrates reflected wavelengths; FIG. 15C illustrates wavelength band transmissions; and FIG. 15D illustrates reflection of other wavelengths;

FIG. 16 illustrates an embodiment of a reconfigurable wavelength aggregation device with fixed and arbitrary wavelength sets;

FIG. 17 illustrates an embodiment of a 1×2 deaggregator with four non-uniform bands and eight wavelengths;

FIG. 18 illustrates an embodiment of 2×2 sixteen wavelengths optical non-uniform waveband cross-connects switch using two deaggregators;

FIG. 19 illustrates schematic diagrams of wavelength switches;

FIG. 20 illustrates schematic diagrams of a band switch architecture with wavelength switches;

FIG. 21 illustrates schematic diagrams of a band switch architecture with optical switches;

FIG. 22 illustrates a single plane architecture with wavelength switches;

FIG. 23 illustrates a single plane architecture with optical switches;

FIG. 24 illustrates a multiple plane architecture with wavelength switches; and

FIG. 25 illustrates a multiple plane architecture with optical switches.

FIG. 26 illustrates a n additional embodiment of a reconfigurable wavelength aggregator device with both fixed and arbitrary wavelength sets.

DESCRIPTION OF PREFERRED EMBODIMENTS

The proper selection of waveband size G, as outlined in the previous section, can significantly improve the performance of a hierarchical hybrid optical cross-connect system, if supported by appropriate switching, routing and (de) aggregation mechanisms. However, any aggregation, in particular the aggregation into uniform wavebands (each comprised of exactly G wavelengths), introduces the aggregation overhead which can adversely affect the hierarchical hybrid cross-connect system's performance.

In order to illustrate the effect of this overhead, consider an optical switching cross-connect system with M output fibers and suppose that the input fiber carries N optical channel signals having N modulating wavelengths to be switched to any of M outputs. Depending on the breakdown of wavelengths among the output fibers, it may or may not be possible to aggregate them into wavebands for optical switching. Consider first the example in FIG. 7. FIG. 7 shows an input fiber carrying N=8 wavelengths that have to be switched into M=4 output fibers. The wavelengths can be aggregated into four preconfigured uniform wavebands of the size of two wavelengths each. If the numbers of wavelengths to be switched to the four output fibers are equal to (3,1,2,2), the switching cannot be done only in the optical domain.

However, the same wavelength demand (3,1,2,2) could have been switched optically if the wavebands had been preconfigured in the way shown in FIG. 8 with two wavebands containing two wavelengths each, one waveband containing three wavelengths and one waveband containing one wavelength. The drawback of the latter arrangement is that it cannot be used for optical switching of other switching arrangements. For instance, when the numbers of wavelengths to be switched to the four output fibers are equal to (2,2,2,2).

A more detailed comparison of uniform and non-uniform wavebands is shown in FIG. 9. This figure illustrates all possible breakdowns of N=8 wavelengths among M=2 output fibers and the number of wavelengths that could be supported by the corresponding wavebands (two wavebands each consisting of 4λ in the uniform case, and two wavebands consisting of 3λ and 5λ in the non-uniform case). While the uniform case permits, on average, 88% of wavelengths to be switched optically, the non-uniform case provides for higher optical throughput of 93%. Of course, because of the already mentioned cost differential between optical and OEO ports, an improvement of optical throughput (in other words, the more efficient "packing" of wavelengths into wavebands) translates into even larger cost savings for the overall hierarchical hybrid cross-connect system. In other words, the increased utilization of cheaper optical ports reduces the need to use more expensive OEO ports.

Conventionally, it seemed that uniform wavebands should be better suited for aggregation of various traffic (wavelength) distributions among the output ports. According to conventional wisdom, and all factors being equal, the uniform distribution of demand among the output fibers is the most probable one. However, the present inventors observed, as illustrated in FIG. 9 the throughput of the uniform distribution (4,4) had a lower probability in the optical domain than the adjacent non-uniform case. This effect is primarily responsible for better performance of non-uniform wavebands. Non-uniform distribution of demands, a phenomenon observed by Y. Ijiri and H. Simon, Skew Distributions and the Sizes of Business Firms, North-Holland Publishing Co. 1977, also justifies the creation of non-uniform wavebands.

The same effect for several other values of N (number of wavelengths) and M (number of output fibers) is illustrated in FIG. 10. Non-uniform wavebands consistently provide better optical throughput, although the amount of improvement varies with N and M.

The concept of non-uniform wavebands gives rise to the following two issues. The first one (the waveband selection problem) is how to preconfigure a set of wavebands that can be used to represent an arbitrary breakdown of input flow of N wavelengths into M output fibers. The second issue (the waveband assignment problem) is how to assign these preconfigured wavebands for optical switching of N wavelengths into M output fibers.

In the absence of other constraints, both the waveband selection problem and waveband assignment problems can be solved. The optimal waveband selection can be accomplished using the following algorithm:

1. Input the parameters N and M and create the empty set B
2. Assign N*=⌈N/M⌉.
3. Add the element N* to the set B.
4. Assign N=N−N*.
5. If N=0, stop. Else go to step 2.

Given the set B of optimal wavebands $\{B_1, B_2 \ldots, B_K\}$, an arbitrary breakdown of demand of N wavelengths into M outputs ($V_1$ wavebands into output fiber 1, . . . , $V_M$ wavebands into output fiber M) can be realized by sequentially assigning the largest available waveband to the largest remaining wavelength demand.

The optical performance of the optimal set B of wavebands $\{B_1, B_2 \ldots, B_K\}$ can be compared with that of the set of uniform wavebands. Such a comparison may not be straightforward for two reasons. First, there may or may not exist K uniform wavebands (in order for them to exist, the number of wavelengths N has to be divisible by K). Second, the optical throughput of a set of uniform wavebands is difficult to evaluate analytically. However, both these obstacles can be handled in the following way. First, evaluation and comparison is performed for only those pairs (N,M) for which N is divisible by K (so the corresponding set of uniform wavebands always exists). Second, the average wavelength "loss" in the set of K wavebands comprising G wavelengths each is approximately equal to M(G−1)/2. This expression is based on the average aggregation overhead (between 0 and G−1) that occurs if the wavelengths destined to each of M outputs are aggregated into wavebands.

With these caveats, FIG. 11 illustrates the performance improvement (and number K of wavebands in the optimal set of wavebands) for all permissible combinations of N and M not exceeding 80. The average improvement in terms of more efficient packing of wavelengths into wavebands is about 15%. Assuming that an optical port costs five times less than an OEO port, the average cost reduction is about 40%.

In general, the following approximation for K can be used:

$$K = M\left(\ln\left(\frac{N}{M}\right) + \gamma\right),$$

where $\gamma \approx 0.5772$ is Euler's constant. Then the comparable size of uniform waveband is $$G = \frac{N}{M\left(\ln\left(\frac{N}{M}\right) + \gamma\right)}.$$

Thus the relative advantage of optimal non-uniform wavebands over optimal one is $$L = \frac{M}{2}\left(\frac{G-1}{N}\right) = \frac{1}{2}\left(\frac{1}{\left(\ln\left(\frac{N}{M}\right) + \gamma\right)} - \frac{M}{N}\right).$$

The performance improvement thus depends only on the ratio s=N/M of number of wavelengths to the number of output fibers. For the values of s from 1 to 10 the performance improvement changes as shown in FIG. 12. The results are consistent with those shown in FIG. 11.

As explained in the previous section, non-uniform optical wavebands can improve the aggregation performance of hierarchical optical cross-connect systems thus further reducing its cost. The non-uniform wavebands have to be realized, which is accomplished by waveband (de)aggregator as discussed below.

Dense wavelength division multiplexing (DWDM), the transmission of multiple wavelengths over a single strand of optical fiber, has become the foundation providing the capacity and traffic separation capabilities required in the future Optical Internet. A key enabling technology of DWDM is optical wavelength aggregation and deaggregation.

Wavelength-division aggregators and deaggregators are devices that combine (couple) and separate (split) different optical wavelengths. A DWDM deaggregator (WDA) separates the wavelength band on an incoming fiber into a number of wavelength subsets, and a DWDM aggregator (WA) combines such subsets into one optical fiber. These wavelength subsets can be uniform (FIG. 1) or non-uniform (FIG. 2) fixed groups. The wavebands can also be arbitrary wavelength sets as illustrated by the subset $[\lambda_1, \lambda_2, \lambda_6, \lambda_n]$ shown as one of the deaggregator outputs in FIG. 3 that is optically switched to a second output fiber and aggregated with other wavebands. A deaggregator device may produce both fixed and arbitrary subsets. A control unit C (FIG. 3) and C1- (FIG. 4) control optical selection and optical-electrical-optical conversion.

By implementing these groupings of wavelengths prior to traversal through the optical switch, it is possible to use an optical switch that has significantly fewer ports than if each wavelength on each incoming fiber were to go to a different input port of the switch. In other words, the wavelength aggregation prior to the switch lifts the burden of doing this aggregation from the switch itself.

FIG. 13 illustrates a general architecture for a deaggregator capable of producing both fixed wavebands and arbitrary wavelength subsets. The incoming fiber carries n wavelengths (typically 40 or 160), from which M output wavelength subsets are to be generated. In order to generate the M subsets, the original n-wavelengths band has to be partitioned into K sub-bands, the smallest number of sub-bands from which the desired M output subsets can be constructed.

For example, suppose the M=3 output subsets $S_1=[\lambda_1,\lambda_2,\lambda_6,\lambda_n]$, $S_2=[\lambda_3-\lambda_5]$, $S_3=[\lambda_7-\lambda_{n-1}]$ are needed. The subsets $S_1$ and $S_2$ may go to input ports of an optical switch, while $S_3$ is dropped to an O-E-O cross-connect switch. The three sets can be constructed, by proper settings of the switches, from the K=5 sub-bands, namely $B_1=[\lambda_1,\lambda_2]$, $B_2=[\lambda_3-\lambda_5]$, $B_3=[\lambda_6]$, $B_4=[\lambda_7-\lambda_{n-1}]$, and $B_5=[\lambda_n]$. These output sets are applied to different ports of a cross-connect switch in which they are connected to different outgoing fibers.

For fixed wavebands, whether they are uniform or not, the 1×M selectors in FIG. 13 contributing to those wavebands are replaced by simple connections. For arbitrary subsets, the contributing sub-bands will be switched to the appropriate output aggregators. The number of output subsets, the wavelengths assignment of each subset, and the separation ratio of the fixed and arbitrary wavelength groups depend very much on the design of the DWDM network and traffic patterns.

The wavelength deaggregator can be implemented by various techniques, including thin-film interference (etalon) filter, fiber Bragg grating (FBG), fused biconic taper, Array Waveguide Grating (AWG), and holographic filter. Thin-film fabrication has been a mature technology for decades. This technology offers wide channel passbands, flat top channel passbands, low insertion loss, moderate isolation, low cost, high yield production, high reliability and field ruggedness, high thermal stability, and moderate filter roll-off characteristics. Thin film technologies work well for optical channel spacing greater than 50 GHz (0.4 nm) and for wavelength bands separation. But current coating technology may not be able to fabricate a narrow band filter with channel spacing less than 25 GHz (0.2 nm). The fiber Bragg grating has the advantage of precise wavelength separation. One embodiment includes a wavelength deaggregator based on mixed technologies of thin-film interference filter and FBG for handling wavelength bands and individual wavelength separations.

The architecture of a waveband generation unit is essentially a series of (non-uniform) band pass operations and recombinations. The worst case scenario for a deaggregator requires an incoming wavelength set to be broken down into the individual wavelengths n. Since the maximum numbers of band pass operations needed to isolate any arbitrary set of wavelengths is n−1, where is the total number of wavelengths to be used in creating the wavelengths to be used in creating the wavelength subsets, this is a rough bound on the complexity of the deaggregator.

A set of ten wavelengths, for example, in a waveband K can further be partitioned into uniform or non-uniform sub-wavebands to isolate one or more wavelengths of interest while maintaining larger groupings of wavelengths that require no individual processing and can simply be connected via the optical switch. This is a further benefit of the flexibility of the present invention.

Wavelength aggregation based on mixed technologies of thin-film interference filter and FBG for handling fixed, uniform wavebands and arbitrary wavelength subsets are shown in FIG. 14, FIG. 15 and FIG. 16.

A three-port optical wavelength selective component is shown in FIG. 14. The component consists of three optical fibers, a self-focused GRIN Lens, and a thin-film intererference filter. In FIG. 14A, an individual (red) wavelength $\lambda_j$, selected from the group of four at the input, follows the trace (a) through a narrowband filter to output fiber 2. All other wavelengths ($\lambda_1$-$\lambda_3$) are reflected back into output fiber 3. In FIG. 14B, showing wavelength band separation, a wideband DWDM filter passes a band of three wavelengths to output fiber 2 and reflects all others back into output fiber 2. FIG. 15A-D show the optical spectra for these two cases at output fibers 1 and 2.

An exemplary implementation of a wavelength deaggregation device, following the architecture of the prior FIG. 13 and FIG. 14, is shown in FIG. 16.

The deaggregator handles 40 input channels of different modulating wavelengths and dynamically aggregates wavelength subsets into 6 output fibers. In this particular example, which does not limit the generality of FIG. 16, the wavelength aggregation device comprises 4 wavelength band separators ($WBS_{1-4}$), 8 individual wavelength separators, and eight 1×2 mechanical optical switches $SW_{1-8}$.

Four wavelength band separators aggregate the bands $\lambda_1$-$\lambda_{10}$, $\lambda_{11}$-$\lambda_{16}$, $\lambda_{17}$-$\lambda_{24}$, and $\lambda_{33}$-$\lambda_{40}$ into output fibers F1, F2, F3, and F4. In contrast, the band of wavelengths from $\lambda_{25}$ to $\lambda_{32}$ is assigned to configuration of two arbitrary wavelength subsets. The wavelengths $\lambda_{25}$, $\lambda_{26}$, $\lambda_{27}$, $\lambda_{29}$ and $\lambda_{32}$ are passed through optical selectors in the "up" position into the output fiber T1. Other wavelengths, $\lambda_{28}$, $\lambda_{30}$ and $\lambda_{31}$ are passed through optical selectors in the "down" position into the output fiber T2.

Configuration changes will take from a few microseconds to a few milliseconds depending on the mechanism used in the optical switch. The size of fixed and arbitrary wavelength subsets, the number of wavelengths in each and the numbers of output fibers can be scaled up and down depending on the application requirements and the network design. Any necessary signal boost can be provided once the waveband groups are formed for transmission on fibers Ti or T2. A control units (not shown) is used to set the positions for the optical selectors.

A further embodiment is illustrated in FIG. 17, a DWDM wavelength deaggregator combines a four fixed non-uniform wavebands separator (4, 1, 1, 2), four 1×2 wavebands selecting switches, and two waveband aggregating devices. An input optical fiber with eight wavelengths is connected to waveband separation device and eight wavelengths are separated into four fixed non-uniform wavebands, $\lambda_1$-$\lambda_4$, $\lambda_5$, $\lambda_6$, and $\lambda_7$-$\lambda_8$. A control unit (not shown) sets the selector position of the two 1×2 selectors. The selector adjacent to the waveband separator is controlled based on port switch contention and requirements for local adding and dropping of optical channels. This drops signals to the OEO switch. The second 1×2 selector is controlled to redirect groups of optical channels to an appropriate output pattern based on a traffic condition. Various routing algorithms are known to one of ordinary skill. Four output wavebands from the waveband separation device are connected with a wavelength contention resolution switch, which is handling the wavelength conflicts during the switching and routing of wavelengths. The following are the optical switches for wavebands selecting and switching based on the routing algorithms and a waveband aggregating device combining the new arranged wavebands into one of two output fibers.

FIG. 18 demonstrates an application example of 2×2 16 $\lambda$s all-optical wavebands cross-connect switch with the capability of solving wavelength contentions using novel deaggregators. There are 3 main sections inside the optical cross-connect switch, namely fixed non-uniform wavebands separation, wavelengths contention drop and re-generation add, and wavebands switching and aggregation. The key devices inside the optical switch are waveband deaggregators and wavebands aggregating devices.

Optical switch takes inputs from 2 single mode optical fibers, each containing 8 wavelengths, ITU-T standard 100 GHz spacing channels. The 8 wavelength channels are divided into 4 non-uniform wavebands with the sizes of 4, 1, 1 and 2. Each of these 4 wavebands goes through a 1×2 optical switch, which allows certain wavelength channels (such as those channels that have potential wavelength contention problems) to be dropped to O-E-O layer. For the rest of the channels, which pass through the first level of switches, they go through the second level of 1×2 switches, which determine which output each of them will go to. The signals that are going into the same output are combined through a waveband aggregation device (the opposite of waveband separation device) and fused couplers. During this process, the signals that are added or regenerated from the O-E-O layer are also aggregated.

In brief, the optical cross-connect system allows each waveband from each input to go to any output or to be dropped to O-E-O layer. It also allows signals added from the O-E-O layer to be aggregated together. The number of ports used in the O-E-O layer can be reduced below that conventionally required for wavelength switching. The reduction in the number of ports reduces the cost of the system. In an exemplary embodiment, the number of OEO ports is less than one half, or even as few as one third of the number of wavelengths processed or received on an input line.

Consider now a hierarchical hybrid optical cross-connect system with M input and output fibers. Each fiber carries N wavelengths. Upon reaching the optical cross-connect system, all N wavelengths in each input fiber are partitioned by non-uniform waveband deaggregators (WDA) into K wavebands $\{B_1, B_2, \ldots, B_K\}$. The wavebands are then optically switched and aggregated (using waveband aggregators, denoted by WA in FIG. 4 and FIG. 5) into output fibers by optical core of the hierarchical hybrid cross-connect system. The cross-connect system architecture can be realized in several ways, as discussed further in this section.

Depending on the specific architecture option, the hierarchical hybrid optical cross-connect system may include two types of optical switches shown in FIG. 19. The first of these switches (denoted as Deselector (a)) is used to process wavebands before they are sent to OEO, and the second switch (denoted as Selector (b)) is used to process wavelengths after they emerge from OEO.

The first group of architecture options is based on optical band switches. Their outputs are either sent to output fibers or dropped to OEO. The wavebands dropped to OEO are either processed by deselectors and selectors (FIG. 20) or, after their demultiplexing into wavelengths, sent to optical switches (FIG. 21). The latter option is similar to one discussed for uniform waveband resolution, while the former option provides a more efficient utilization of OEO ports based on non-uniform wavebands. This is achieved by better sharing of OEO ports: since the wavebands that have to be dropped to OEO have different sizes, it is possible to drop several smaller wavebands at the same time, an option unavailable for uniform wavebands. The realization of each of the two options require k(M+1)M crosspoints.

The second group of architecture options is based on single plane architecture. The outputs of waveband deaggregators are either switched by a single optical switch or dropped to OEO. The wavebands dropped to OEO are either processed by deselectors and selectors (FIG. 22) or, after their demultiplexing into wavelengths, sent to optical switches (FIG. 23). The latter option is similar to one discussed for uniform waveband resolution, while the former option provides a more efficient utilization of OEO ports based on non-uniform wavebands. This is achieved by better sharing of OEO ports: since the wavebands that have to be dropped to OEO have different sizes, it is possible to drop several smaller wavebands at the same time, an option unavailable for uniform wavebands. The notations $B_i^*$ and $B_i^{**}$ in FIG. 23 denote the dropped and added wavebands. The realization of each of the two options require $(kM+n)^2$ crosspoints.

The third group of architecture options is based on multiple planes architecture. The outputs of waveband deaggregators are either switched by K parallel optical switches (the ith parallel switches handles the same waveband $B_i$ for all input fibers) or dropped to OEO. The wavebands dropped to OEO are either processed by Lambda switches (FIG. 24) or, after their demultiplexing into wavelengths, sent to optical switches (FIG. 25). The latter option is similar to one discussed for resolution of uniform wavebands, while the former option provides a more efficient utilization of OEO ports based on non-uniform wavebands. This is achieved by better sharing of OEO ports: since the wavebands that have to be dropped to OEO have different sizes, it is possible to drop several smaller wavebands at the same time, an option unavailable for uniform wavebands. The realization of each of the two options require $k(M+n)^2$ crosspoints.

It is also possible to further classify DWDM aggregators and deaggregators into three categories in terms of the wavelength spacings with which they are dealing:

Broadband WDMs (BWDMs) combine and separate entirely separate wavelength groups, e.g. 1310 nm and 1550 nm channels or 850 nm and 1310 nm channels. The applications are Passive Optical Network (PON) and bi-directional video transmission.

Coarse WDMs (CWDMs) combine and separate wavelength channels with center-to-center spacing greater than 200 GHz, equivalent to 1.6 nm. The typical applications are metro-area networks with wavelength spacing about 20 nm.

DWDMs combine and separate adjacent wavelength channels. DWDMs will play a key role in the next generation of optical networks with wavelength spacings of 25 GHz (0.2 nm), 50 GHz (0.4 nm), 100 GHz (0.8 nm) and 200 GHz (1.6 nm) and with a total of more than 320 wavelengths over the "S" band, "C" band and "L" bands around 1475 to 1550 nm.

As a further feature of the reconfigurable (de)aggregator, uniform and non-uniform wavebands can be selectively configured as shown in FIG. 26. Here, non-uniform wavebands $\lambda_{25-26}$, $\lambda_{27-28}$, $\lambda_{29-30}$, and $\lambda_{31-32}$ are subject to two selection operations. At the first optical selector, it is determined whether further resolution of the wavebands is necessary. If not, no wavelength isolation is applied, as in the case of $\lambda_{25-26}$, which is output to a fiber. Otherwise, the waveband is resolved to individual wavelength components to be re-grouped into appropriate wavebands or wavelengths for processing and/or transmission. This cascade of optical waveband filters and optical selectors allows hierarchical levels of granularity, thereby improving efficiency and flexibility considerations.

The present invention includes hybrid optical systems consisting of a novel non-uniform waveband (de)aggregator and two types of switches: a waveband (optical transparent) switch and a wavelength (opaque OEO) one. The deaggregator is operable to form non-uniform wavebands, and their performance advantage was compared with uniform wavebands. Finally, several architectural options for a hierarchical hybrid optical cross-connect system were proposed that combine non-uniform wavebands and improved utilization of OEO ports.

While preferred embodiments of the invention have been described herein, one skilled in the art would understand that various modifications can be made without departing from the spirit and scope of the present invention.

What is claimed is:

1. An optical deaggregator receiving an input line carrying a plurality (n) of optical channels modulated at different wavelengths, said deaggregator dividing the plurality of optical channels into at least a first group of optical channels having a first population of different modulating wavelengths and a second group of optical channels having a second population of different modulating wavelengths, wherein the first and second population differ in value from each other, wherein said plurality of (n) optical channels include at least eight different modulating wavelengths, and said first population comprises an integer value of more than 0.25n number of modulating wavelengths and said second population includes a non-zero integer value of less than 0.25n number of modulating wavelengths, wherein said first population of different modulating wavelength and said second population of different modulating wavelength are passed through at least one optical selector.

2. The optical deaggregator of claim 1, wherein said plurality of optical channels include eight modulating wavelengths divided into said first population of three modulating wavelengths, said second population of one modulating wavelength and third and fourth populations of two modulating wavelengths.

3. The optical deaggregator of claim 1, wherein said plurality of optical channels include sixteen modulating wavelengths, divided into said first population of five modulating wavelengths, said second population of three modulating wavelengths, a third population of six modulating wavelengths and a fourth population of two modulating wavelengths.

4. The optical deaggregator of claim 1, wherein said first population comprises an integer value of at least 0.5n number of modulating wavelengths and said second population comprises a non-zero integer value of 0.25n or less number of modulating wavelengths.

5. An optical cross-connect system comprising:
a deaggregator according to any one of claims 1-4; and an optical switch for switching the first and second groups of optical channels.

6. The deaggregator of claim 1, wherein the channels of the first and second groups of optical channels are output to respective first and second carrier medium which are directly connected to the deaggregator.

7. An optical deaggregator receiving an input line carrying a plurality (n) of optical channels modulated at different wavelengths, said deaggregator dividing the plurality of optical channels into at least a first group of optical channels having a first population of different modulating wavelengths and a second group of optical channels having a second population of different modulating wavelengths, wherein the first and second population differ in value from each other, wherein said first population of different modulating wavelength and said second population of different modulating wavelength are passed through at least one optical selector, wherein said plurality of optical channels include sixteen modulating wavelengths divided into said first population of four modulating wavelengths, said second population of two modulating wavelengths, two third populations of three modulating wavelengths each, and four fourth populations of one modulating wavelength each.

8. An optical cross-connect system receiving an input line carrying a plurality of optical channels modulated at different wavelengths, said cross-connect system comprising:
an optical deaggregator comprising:
a first filter for isolating one or more of the plurality of optical channels according to modulating wavelength;
an optical selector, operable to group one or more of the plurality of optical channels output by the first filter into at least a first group of optical channels and a second group optical channels;
said cross-connect system further comprising:
an optical switch for directing said first group to a first output fiber and said second group to a second output fiber; and further comprising an optical-electrical-optical switch to convert at least one of the plurality of optical channels to an electrical signal and to reconvert the electrical signal to a converted light signal prior to output to one of the first and second output fibers.

9. The optical cross-connect system according to claim 8, wherein a control unit directs the optical selector to direct said one of the plurality of optical channels to the optical-electrical-optical switch.

10. The optical cross-connect system according to claim 9, wherein said control unit directs the optical electrical-optical switch to direct said converted light signal to said optical switch.

11. The optical cross-connect system of claim 8, wherein the optical-electrical-optical switch has n port input connections, wherein n is less than one half the number of the plurality of optical channels of said input line.

12. An optical cross-connect system receiving an input line carrying a plurality of optical channels modulated at different wavelengths, said cross-connect system comprising:
an optical deaggregator comprising:
a first filter for isolating one or more of the plurality of optical channels according to modulating wavelength;
an optical selector, operable to group one or more of the plurality of optical channels output by the first filter into at least a first group of optical channels and a second group optical channels;
said cross-connect system further comprising:
an optical switch for directing said first group to a first output fiber and said second group to a second output fiber; and further comprising an optical-electrical-optical switch to convert one of the plurality of optical channels to an electrical signal and to reconvert the electrical signal to a converted light signal prior to output to one of the first and second output fibers, said converted light signal being input directly to one of first and second optical combiners without passing through said optical switch.

13. An optical cross-connect system receiving an input line carrying a plurality of optical channels modulated at different wavelengths, said cross-connect system comprising:
an optical deaggregator comprising:
a first filter for isolating one or more of the plurality of optical channels according to modulating wavelength;
an optical selector, operable to group one or more of the plurality of optical channels output by the first filter into at least a first group of optical channels and a second group optical channels;
said cross-connect system further comprising:
an optical switch for directing said first group to a first output fiber and said second group to a second output fiber, and further comprising an optical-electrical-optical switch to add a new signal to one of the first and second output fibers, said new signal originating outside of the input line, and said new signal being input directly to one of first and second combiners without passing through said optical switch.

14. An optical cross-connect system receiving an input line carrying a plurality of optical channels modulated at different wavelengths, said cross-connect system comprising:
an optical deaggregator comprising:
a first filter for isolating one or more of the plurality of optical channels according to modulating wavelength;
an optical selector, operable to group one or more of the plurality of optical channels output by the first filter into at least a first group of optical channels and a second group optical channels;
said cross-connect system further comprising:
an optical switch for directing said first group to a first output fiber and said second group to a second output fiber, wherein the optical-electrical-optical switch receives the at least one of said plurality of optical channels and converts the received signal to an electrical signal and reconverts the electrical signal to a converted light signal, and said control unit directs the optical electrical-optical switch to direct said converted light signal to said optical switch.

15. An optical cross-connect system receiving an input line carrying a plurality of optical channels modulated at different wavelengths, said cross-connect system comprising:
an optical deaggregator comprising:
a first filter for isolating one or more of the plurality of optical channels according to modulating wavelength;
an optical selector, operable to group one or more of the plurality of optical channels output by the first filter into at least a first group of optical channels and a second group optical channels;
said cross-connect system further comprising:
an optical switch for directing said first group to a first output fiber and said second group to a second output fiber, wherein the optical-electrical-optical switch receives the at least one of said plurality of optical channels and converts the received signal to an electrical signal and reconverts the electrical signal to a converted light signal, and said control unit directs the optical electrical-optical switch to direct said converted light signal to said optical switch.

16. An optical cross-connect system receiving an input line carrying a plurality of optical channels modulated at different wavelengths, said cross-connect system comprising:
an optical deaggregator comprising:
a first filter for isolating one or more of the plurality of optical channels according to modulating wavelength;
an optical selector, operable to group one or more of the plurality of optical channels output by the first filter into at least a first group of optical channels and a second group optical channels;

said cross-connect system further comprising:

an optical switch for directing said first group to a first output fiber and said second group to a second output fiber, wherein the optical-electrical-optical switch receives the at least one of said plurality of optical channels and converts the received signal to an electrical signal and reconverts the electrical signal to a converted light signal, and said control unit directs the optical electrical-optical switch to direct said converted light signal to said optical switch.

17. An optical cross-connect system receiving a set of optical channels having different modulating wavelengths, said cross-connect system comprising:

at least a first waveband filter isolating a plurality of optical channels based on modulating wavelength, for output to a first output fiber; and an optical-electrical-optical switch to convert the individual modulating wavelength isolated by the wavelength filter to an electrical signal and to reconvert the electrical signal prior to output to one of the second or the third output fiber, at least one wavelength filter for isolating an individual modulating wavelength of the set of optical channels, which is not isolated by the waveband filter;

a first optical selector connected to the output of the wavelength filter to selectively add the output of the wavelength filter to one of a second output fiber or a third output fiber.

18. The optical cross-connect system of claim 17, further comprising a plurality of wavelength filters, each isolating one of the set of plurality of optical channels which is not isolated by the waveband filter; and a plurality of optical selectors, each selector respectively coupled to one of the plurality of wavelength filters, to selectively add a respective output of the wavelength filter to one of said first, second and third output fibers.

19. The optical cross-connect system of claim 18, each of said plurality of optical selectors being optically coupled with another one of said plurality of optical selectors to selectively group outputs of the wavelength filters for output to one of said first, second and third output fibers.

20. The optical cross-connect system of claim 19, wherein the optical coupling of the optical selectors is reconfigurable over different time intervals.

21. The optical cross-connect system of claim 17, further comprising a second waveband filter for isolating a plurality of optical channels of said received set of optical channels which are not isolated by said first waveband filter and said wavelength filter.

22. The optical cross-connect system of claim 21, wherein a quantity of modulating wavelengths isolated by the first waveband filter is different from a quantity of modulating wavelengths isolated by the second waveband filter.

23. An optical cross-connect system comprising:

an optical deaggregator receiving an input line carrying a plurality (n) of optical channels modulated at different wavelengths, said deaggregator dividing the plurality of optical channels into at least a first group of optical channels having a first population of different modulating wavelengths and a second group of optical channels having a second population of different modulating wavelengths, wherein the first and second population differ in value from each other, wherein said plurality of (n) optical channels include at least eight different modulating wavelengths, and said first population comprises an integer value of more than 0.25n number of modulating wavelengths and said second population includes a non-zero integer value of less than 0.25n number of modulating wavelengths, wherein said first population of different modulating wavelength and said second population of different modulating wavelength are passed through at least one optical selector;

an optical switch for switching the first and second groups of optical channels;

a control unit controlling at least one of:

formations of the first and second groups of optical channels by said deaggregator and switching the first and second groups of optical channels.

24. An optical cross-connect system receiving a set of optical channels having different modulating wavelengths, said cross-connect system comprising:

a first waveband filter isolating a plurality of optical channels of the received set based on modulating wavelength;

a second waveband filters receiving the isolated plurality of optical channels;

an individual wavelength filter located downstream of the second waveband filter for further isolating one of the isolated plurality of optical channels; and an optical-electrical-optical switch to convert the further isolated optical channel to an electrical signal and to reconvert the electrical signal to a light signal prior to output to an optical fiber.

25. The optical cross-connect system of claim 24 further comprising an optical selector receiving an output of the first waveband filter to direct the isolated plurality of optical channels to one of a first and second process.

26. The optical cross-connect system of claim 25, wherein the optical selector is reconfigurable over different time intervals.

27. The optical cross-connect system of claim 26 further comprising a second optical selector receiving the isolated optical channel from said wavelength filter to direct the isolated optical channel to one of a first and second process.

* * * * *